United States Patent
Curcio et al.

(10) Patent No.: US 7,296,205 B2
(45) Date of Patent: Nov. 13, 2007

(54) DATA REPAIR

(75) Inventors: Igor Danilo Curcio, Tampere (FI); Rod Walsh, Tampere (FI); Guruprasad Balasubramanyam, Tampere (FI); Juha-Pekka Luoma, Tampere (FI)

(73) Assignee: Nokia Corporation, Espoo (FI)

( * ) Notice: Subject to any disclaimer, the term of this patent is extended or adjusted under 35 U.S.C. 154(b) by 584 days.

(21) Appl. No.: 10/782,371

(22) Filed: Feb. 18, 2004

(65) Prior Publication Data

US 2005/0182995 A1    Aug. 18, 2005

(51) Int. Cl.
G08C 25/02    (2006.01)
G06F 15/16    (2006.01)

(52) U.S. Cl. .................. 714/748; 709/231
(58) Field of Classification Search ........... 714/748
See application file for complete search history.

(56) References Cited

U.S. PATENT DOCUMENTS

| | | | | |
|---|---|---|---|---|
| 6,141,785 | A * | 10/2000 | Hur et al. | 714/748 |
| 6,526,022 | B1 * | 2/2003 | Chiu et al. | 370/229 |
| 6,782,490 | B2 * | 8/2004 | Maxemchuk et al. | 714/18 |
| 2002/0095636 | A1 | 7/2002 | Tatsumi et al. | 714/748 |
| 2003/0031175 | A1 | 2/2003 | Hayashi et al. | 370/390 |

FOREIGN PATENT DOCUMENTS

| | | |
|---|---|---|
| EP | 1146683 A2 | 10/2001 |
| EP | 1185033 A1 | 3/2002 |
| GB | 2287383 | 9/1995 |

OTHER PUBLICATIONS

"Asynchronous Layered Coding (ALC) Protocol Instantiation", RFC 3450, Luby et al., Dec. 2002, 30 page document.
"NACK-Oriented Reliable Multicast Protocol (NORM)", Adamson et al., Internet Draft, Jan. 2004, 67 page document.
"Forward Error Correction (FEC) Building Block", RFC 3452, Luby et al., Dec. 2002, 15 page document.
"FLUTE—Flute Delivery over Unidirectional Transport", Paila et al., Internet Draft, Dec. 2003, 28 page document.
3GPP TS 23.246, V.6.1.0, Dec. 2003, Release 6, Section 7.1, Technical Specification Group Services and System Aspects; Multimedia Broadcast/Multicast Service (MBMS); Architecture and Functional Description, 38 page document.
3GPP TS 23.246, V.6.1.0 (Dec. 2003), Technical Specification, 3rd Generation Partnership Project; Technical Specification Group Services and System Aspects; Multimedia Broadcast/Multicast Service (MBMS); Architecture and functional description (Release 6).

* cited by examiner

*Primary Examiner*—Shelly Chase

(57) ABSTRACT

The invention relates to a method for data repair in a system capable of one-to-many transmission. The method comprises transmitting data from a sender to at least one receiver and provides for various sender driven or receiver driven repair methods of missing data.

47 Claims, 11 Drawing Sheets

DATA REPAIR

FIELD OF THE INVENTION

The invention generally relates to multicast and broadcast transmission technology and services, that is, services with at least one data source (or sender) and at least one receiver.

BACKGROUND OF THE INVENTION

For one-to-many (i.e., point-to-multipoint) services over systems such as IP multicast, IP datacasting (IPDC) and multimedia broadcast/multicast services (MBMS), file delivery (or discrete media delivery or file download) is an important service. Many of the features for delivering files over point-to-point protocols such as file transfer protocol (FTP) and hypertext transfer protocol (HTTP) are problematic for one-to-many scenarios. In particular, the reliable delivery of files—that is the guaranteed delivery of files—using similar one-to-one (i.e., point-to-point) acknowledgement (ACK) protocols such as transmission control protocol TCP is not feasible.

The Reliable Multicast Transport (RMT) Working Group of the Internet Engineering Task Force (IETF) is in the process of standardizing two categories of error-resilient multicast transport protocols. In the first category, reliability is implemented through the use of (proactive) forward error correction (FEC), that is, by sending a certain amount of redundant data that can help a receiver in reconstructing erroneous data. In the second category, receiver feedback is used in order to implement reliable multicast transport. Asynchronous Layered Coding (ALC, RFC 3450) is a protocol instantiation belonging to the first category, while the NACK-Oriented Reliable Multicast (NORM) protocol presents an example of the second category. The details of ALC and NORM protocols are discussed in more detail in publications entitled "Asynchronous Layered Coding (ALC) Protocol Instantiation" (IETF RFC 3450) and "NACK-oriented Reliable Multicast Protocol" (Internet Draft) prepared by the Working Group of the IETF. The contents of these publications are fully incorporated herein by reference.

Access networks on which these protocols can be used include, but are not limited to, wireless multiple-access networks such as radio access networks of the Universal Mobile Telecommunications Services (UMTS) system, wireless local area networks (WLAN), Digital Video Broadcasting—Terrestrial (DVB-T) networks and Digital Video Broadcasting—Satellite (DVB-S) networks.

Briefly, ALC protocol is a proactive FEC based scheme that allows receivers to reconstruct mangled packets or packets that have not been received. ALC protocol uses FEC encoding on multiple channels, allowing the sender to send data at multiple rates (channels) to possibly heterogeneous receivers. Additionally, ALC protocol uses a congestion control mechanism to maintain different rates on different channels.

ALC protocol is massively scalable in terms of the number of users because no uplink signalling is required. Therefore, any amount of additional receivers does not exactly put increased demand on the system. However, ALC protocol is not 100% reliable because reception is not guaranteed, thus it may be generally described as robust, rather than reliable.

NORM, in turn, specifies the use of negative acknowledgement (NACK) messages in order to signal which packets of data (or otherwise defined "data blocks") expected to arrive at the receiver were not received at the receiver (or were received incorrectly). In other words, receivers employ NACK messages to indicate loss or damage of transmitted packets to the sender. Accordingly, a receiver that "missed" some data blocks from a data transmission can send a NACK message to the sender requesting the sender to re-transmit the missed data block or blocks. NORM protocol also optionally allows for the use of packet-level FEC encoding for proactive robust transmissions.

File Delivery over Unidirectional Transport (FLUTE) is a one-to-many transport protocol that builds on FEC (RFC 3452) and ALC building blocks. It is intended for file delivery from sender(s) to receiver(s) over unidirectional systems. It has specializations which make it suitable to wireless point-to-multipoint (multicast/broadcast) systems. The details of FLUTE protocol are discussed in more detail in the publication entitled "FLUTE—File Delivery over Unidirectional Transport" (Internet Draft) prepared by the above-mentioned Working Group of the IETF. The contents of this publication are fully incorporated herein by reference.

NACK messages are not generally NORM specific, but they can also be used in connection with other protocols or systems, such as FLUTE. An ACK is a response message a receiver sends after receiving one or more data packets to acknowledge they were received correctly. A NACK is a response a receiver sends to the sender about packets that are/were expected to arrive, but have never been received.

When in multicast or broadcast environment the data transmission occurs in a one-to-many fashion. If the transmission is not error free and different receivers are subject to different error rates (for example in MBMS users in different cells may experience different signal quality and, as a consequence, different error rate), there is the problem of providing increased data reliability. This can be achieved through the use of FEC and/or through the use of repair sessions.

FEC provides a certain amount of redundancy to the transmitted data, in order to allow a certain degree of error resilience to enable a receiver to reconstruct the transmitted data. However, one problem of FEC is that it usually does not provide error free error recovery, or it provides full error recovery at the cost of a high use of data redundancy, which increases the channel bandwidth requirements.

A repair session (between receiver and sender) can be employed to complement FEC (to reduce or eliminate the residual channel error rate), or can be used alone as the only method for error recovery. A repair session can occur over a point-to-point channel using a separate session. In this case, all the receivers that have missed some data during the multicast/broadcast transmission, send NACK requests to the sender to request the retransmission of the missing packets. However, if all the receivers miss at least one data packet, all the receivers will establish simultaneously point-to-point connections with the sender causing feedback implosion, i.e., congestion in the network (in uplink direction for the large number of NACKs and in downlink direction for the large number of concurrent retransmission and network connection requests) and overload of the sender. This situation is critical when considering for example thousands of users, like the case may be in MBMS networks.

SUMMARY OF THE INVENTION

Embodiments of the invention provide for scalable and efficient repair of broadcast/multicast (one-to-many) sessions.

According to a first aspect of the invention, there is provided a method for data repair in a system capable of one-to-many transmission, the method comprising:
    transmitting data from a sender to at least one receiver;
        providing sender driven or receiver driven repair of missing data, concerning data missing at the receiver.

The term "one-to-many transmission" is considered to mean in the context of the present application any transmission from at least one sender to more than one receiver. Accordingly, the term "one-to-many" here can be interpreted to mean "one-to-more than one". The term "missing data" is considered to mean data not received at all at the receiver as well as data incorrectly received.

According to a second aspect of the invention, there is provided a receiver device for data repair in a system capable of one-to-many transmission, the receiver device comprising:
means for receiving data transmitted by a sender; and
means for sender driven or receiver driven repair of missing data, concerning data missing at the receiver device.

According to a third aspect of the invention, there is provided a sender device for data repair in a system capable of one-to-many transmission, the sender device comprising:
means for transmitting data to at least one receiver; and
means for sender driven or receiver driven repair of missing data, concerning data missing at the receiver.

According to a fourth aspect of the invention, there is provided a system capable of one-to-many transmission, the system comprising a sender device, a network and at least one receiver device, the system comprising:
means for transmitting data from said sender device, via said network, to said at least one receiver device; and
means for providing sender driven or receiver driven repair of missing data, concerning data missing at the receiver device.

According to a fifth aspect of the invention, there is provided a software application executable in a receiver device for data repair in a system capable of one-to-many transmission, the software application comprising:
program code for causing the receiver device to receive data transmitted by a sender; and
program code for sender driven or receiver driven repair of missing data, concerning data missing at the receiver device.

According to a sixth aspect of the invention, there is provided a software application executable in a sender device for data repair in a system capable of one-to-many transmission, the software application comprising:
program code for causing the sender device to transmit data to at least one receiver; and
program code for sender driven or receiver driven repair of missing data, concerning data missing at the receiver.

The software applications may be computer program products, comprising program code, stored on a medium, such as a memory.

Dependent claims relate to embodiments of the invention. The subject matter contained in dependent claims relating to a particular aspect of the invention is also applicable to other aspects of the invention.

BRIEF DESCRIPTION OF THE DRAWINGS

Embodiments of the invention will now be described by way of example with reference to the accompanying drawings in which.

DETAILED DESCRIPTION

The subject-matter contained in the introductory portion of this patent application may be used to support the detailed description, hi the following the File Delivery over Unidirectional Transport (FLUTE) protqcol is used as an example without an intention to limit the present invention to involve FLUTE only. Any other suitable protocol capable of one-to-many multicast or broadcast file delivery is also applicable here.

US-patent application entitled "AN APPARATUS, SYSTEM, METHOD AND COMPUTER PROGRAM PRODUCT FOR RELIABLE MULTICAST TRANSPORT OF DATA PACKETS" (Ser. No. 10/743,948) filed on Dec. 24, 2003, having the same assignee as the present application presents methods for reliable multicast transport of data packets. The contents of that application are fully incorporated herein by reference.

US-patent application entitled "IDENTIFICATION AND RE-TRANSMISSION OF MISSING PARTS" (Ser. No. 10/777,926) filed on Feb. 13, 2004, having the same assignee as the present application presents methods for identifying and re-transmitting missing data in a system capable of one-to-many trans-mission. Also the contents of that application are fully incorporated herein by reference.

Figure 1A:
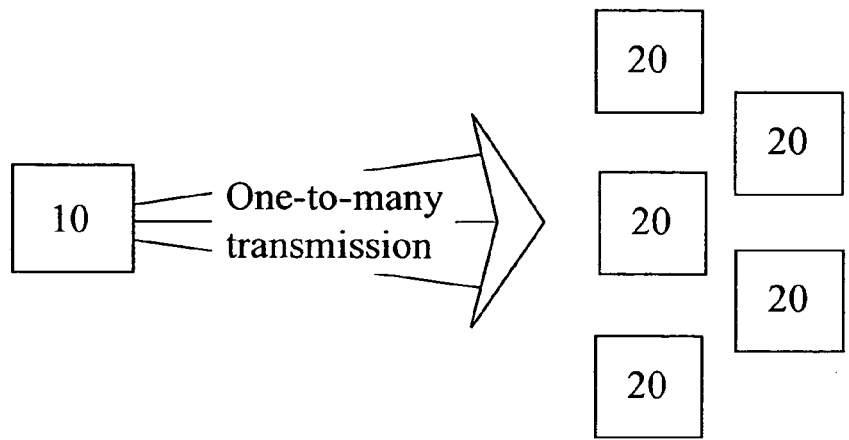
FIG. 1A shows a one-to-many data transmission scenario in accordance with an embodiment of the invention.

FIG. 1A shows a one-to-many data transmission scenario in accordance with an embodiment of the invention. The sender device 10 is a server, IP-based device, DVB device, GPRS (or UMTS) device or similar device that may use proactive forward error correction, such as an ALC mechanism and/or FEC mechanism, for sending multicast data blocks (or packets) to receiver devices 20 in a one-to-many fashion. Each receiving device 20 sends negative acknowledgement NACK messages (or requests) to the sender device 10 concerning missing blocks (blocks not received or received incorrectly). In response to NACK message(s), the sender device 10 generally re-transmits missing blocks to the receiver device 20 in a FLUTE session (the same session as the original FLUTE session established for original transmission, or a subsequent FLUTE session). Alternatively a session using another protocol than FLUTE may be used. In the context of the present application, a re-transmission session is called a repair session.

Data is transferred from sender 10 to receiver(s) 20 as objects. For instance, a file, a JPEG image, a file slice are all objects. A session is established between the sender device 10 and the receiver device(s) 20 for file (or data) delivery. A single session may include the transmission of a single object or multiple objects. Different identifiers are used to identify the objects and sessions.

Each data block has a number called source block number (SBN) or similar, which identifies each block. Blocks are represented by a set of encoding symbols. An encoding symbol identifier (ESI) or similar, in turn, indicates how the encoding symbols carried in the payload of a data packet (or block) were generated from the above-mentioned object (e.g., file).

Figure 1B:
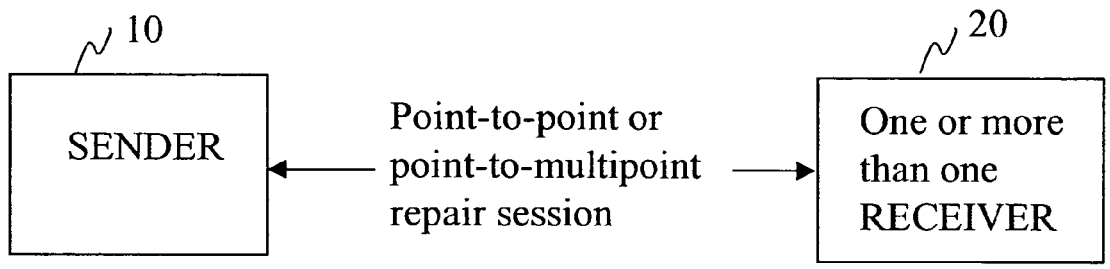
FIG. 1B shows different missing data repair methods in accordance with embodiments of the invention.

FIG. 1B shows different missing data repair methods in accordance with embodiments of the invention. Repair of missing data can be performed by using a point-to-point repair session established between the sender 10 and the receiver 20 or by using a point-to-multipoint session between the sender 10 and more than one receiver 20. In a repair session missing data in total or in part (depending on the case) is re-transmitted from the sender 10 to the receiver(s) 20 or the whole transmission can be repeated. Repair is effected from the original sender 10 or from a "third party server" or a repair server (or just simply a separate server (not shown)) which has a connection with the original server and is configured to buffer the transmission data/information. This server may, for example, be colocated with the original sender (e.g., an MBMS (Multimedia Broadcast/Multicast Service) server, also called BM-SC (Broadcast Multicast—Service Centre)), or, for example, be a separate server within an UMTS operator's network.

Generally, in embodiments of the invention, FLUTE or a separate repair session with a method other than FLUTE, e.g., HTTP, SMS, FTP, SAP, GPRS, etc. with suitable underlying protocols can be used for missing data repair.

Figure 2A:
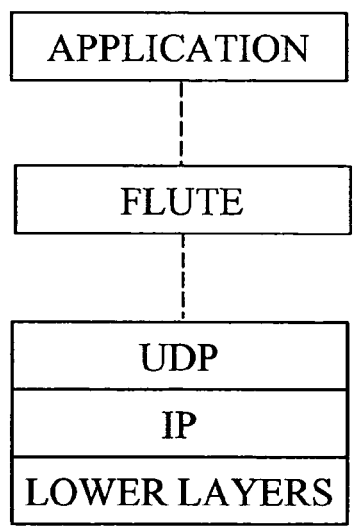
FIG. 2A illustrates a simplified protocol architecture in accordance with an embodiment of the invention.

FIG. 2A illustrates a simplified protocol architecture in accordance with an embodiment of the invention. According to this embodiment, the protocol stack to be implemented for the sender device 10 and the receiver device(s) 20 comprises an application layer, FLUTE protocol layer, UDP and IP layers and lower layers. FLUTE protocol layer is built on top of ALC protocol instantiation of the layered coding transport (LCT) building block (not shown). FEC building blocks (not shown) can be used. FLUTE protocol layer together with NACK messages is in—tended to provide reliable data block transmission from the sender device 10 to the receiver device 20. This protocol architecture can be used for one-to-many transmission (for both one-to-many "first transmissions" as well as one-to-many re-transmissions in a repair session).

Figure 2B:
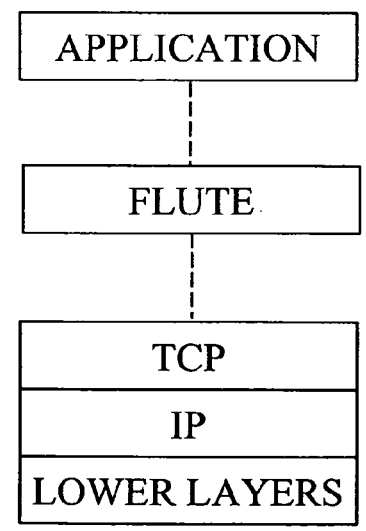
FIG. 2B illustrates a simplified protocol architecture in accordance with another embodiment of the invention.

Alternatively, in an embodiment a TCP layer can be used instead of the UDP layer (see FIG. 2B). This applies for the case in which a separate point-to-point repair session (here: TCP session) is used for one-to-one (i.e., point-to-point) retransmissions.

It has been observed that, in general, reliable multicast systems present the problem of requiring receiver-server control and data messaging which, due to the multiparty nature of multicast, presents scalability problems. There are three areas, in particular, which are of concern:

a) limited radio bandwidth and activation resources, where the time to activate many radio channels, and the radio bandwidth that would take, makes it infeasible to allow many repairs to occur simultaneously;

b) limited server capacity, where the server system, which is providing the "repair content" data, can handle limited numbers of requests (messaging) and associated session context data within a certain time window and a limited amount of simultaneous data transfer sessions; and c) limited end-to-end bandwidth, due to one or more bottlenecks in the overall system. Here the data rate, which could be made available to all the users requiring repair simultaneously, is, in many cases, insufficient to provide this service.

Thus, a critical factor in increasing scalability under any or all of these limitations is to distribute the messaging in suitable time or avoid it entirely, if applicable.

In the following, methods for efficient repair of a multicast/broadcast session are given. The methods are based on the sender decisions or based on the receiver decision.

In the following discussion, with "sender" is denoted the data source or any other added or companion data source unit of a given multicast/broadcast network architecture (e.g., the Application Adjunct Entity, as defined in 3GPP TS 23.246 Rel. 6, V.6.1.0, sec. 7.1). Generally, the term "NACK" (Negative Acknowledgement) is used replaceably with "Repair Request" as the motivation for both is generally the same; however each of these methods can be used to NACK without the implicit request for repair in embodiments where objectives such as data gathering, rather than reliable delivery, are paramount. It is also to be noted that NACKing erroneous/missing data is generally a more efficient acknowledgement scheme for reliable multicast than positive acknowledgement schemes. However, this does not exclude the use of the described methods with positive ACK schemes where useful.

A) Sender Driven Repair Methods

Method A1:

With this method, the sender transmits to the receivers an error rate parameter (for example the SDU error rate) during the session announcement (using for example a session description protocol, such as SDP, or any other means). (Other error rates in increments of bits, packets and other data units may be preferred in some embodiments.)

The receivers interpret the received parameter as the error rate threshold beyond which the receivers should not request repair sessions using point-to-point sessions. If the sender has knowledge of the average receiver error rate and/or knowledge of the average percentage of receivers that receive erroneous data, it can determine, based on thresholds, to re-transmit the complete data stream in multicast/broadcast to all the users, avoiding receiver feedback implosion and a too high number of point-to-point connections that perform data repair. The means for the sender to know the average receiver error rate and the average percentage of receivers that receive erroneous data are for example given by network messages informing the sender of the quality or error rate (and/or the number of receivers) per cell, geographical area or receiver.

An example of the preceding is as follows:

The sender announces using SDP a broadcast/multicast session sending an error rate threshold of 10%. The broadcast/multicast session starts and the receiver finds out that data is received with an error rate >10%. Then it refrains from requesting the re-transmission of the missing packets via a point-to-point session. If the sender knows that the average receiver error rate is >10% and/or that the average percentage of receivers that receive erroneous data is >50% it may decide to re-transmit the complete data session in multicast/broadcast (10% and 50% are here example values).

Alternatively, if the sender has knowledge of the average receiver error rate and/or the average percentage of receivers that receive erroneous data and the sender has determined that it is the case to re-transmit the entire data session (e.g., because of high average receiver error rate), the sender can decide to send a Point-to-multipoint repair token to the receivers at the end of the session, to announce that the session will—or alternatively "will not"—be re-transmitted in multicast/broadcast fashion (optionally listing the file(s)

(and/or listing the block(s) of data within the file(s)) that will be repaired). This avoids the receivers to start point-to-point connections for performing data repair. The repair token is transmitted using any communication protocol at any of the layers 1-7 of the ISO OSI protocol stack, including via SDP in a separate "announcement" after the multicast/broadcast transmission. This can also be included in the last part (e.g., the very last packet) of a FLUTE file delivery within a multicast/broadcast transmission.

Method A2:

As described in section 7.1 of 3GPP TS 23.246 Rel. 6, V.6.1.0 for MBMS, in order to avoid network overload the sender can distribute the address of (one of many) Application Adjunct Entities (AAE) and parameters to generate a random time dispersion of the uplink traffic to the receivers at activation time. It is to be noted that although the specification states "one of many", it can be understood to mean also "one or more of more than one".

Method A2 relies on the fact that the sender sends this information not at activation time Ooin), but at session announcement time (via SDP or any other suitable means). This method therefore defines two parameters to be delivered to the receivers during session announcement:

AAE address or similar (the name of the parameter is exemplary); and
random time.

The random time can be computed, for example, on the basis of the knowledge the sender has about the location of the receivers. For example, if the sender knows that the receivers are distributed into different network cells of a cellular network (such as GPRS or UMTS), the sender will compute a random time in order to avoid all the receivers in the same cell to request a point-to-point repair at the same time (so, it will take into account the physical location). Instead, it will make sure the request for point-to-point connections are distributed along different cells in different time. If the sender has no information on the location of the receivers, then it will deliver to the receivers a random time parameter based only on the time (no physical location into account). The random time parameter indicates the start time of the point-to-point repair session.

An extension to the prior art (3GPP TS 23.246 v. 6.1.0) and the method just described above is to provide a "NACK-supression parameter set" rather than just a "random time". One case of this would be to implement an algorithm "NACK-alg-3, fast-window=500 seconds;uniform, slow-window=5000 seconds;normal, error_threshold_for_slow_window" where the algorithm defines the use of two time windows for NACK suppression—and time and statistical distribution parameters for each are given—and an input parameter to select between the use of the two (more explanation of this kind of NACK-suppression scheme is given below in connection with methods A4 and A5).

Method A3:

In another embodiment of the invention the sender, after reception of a certain number of NACK requests from the receivers may decide, based on its own thresholds, to close the point-to-point connections and re-transmit the entire (or part of the) session in multicast/broadcast. This happens if the sender understands that the receivers have made too many re-transmission requests (i.e., there is a higher error rate), and it is better to avoid wasting network resources using point-to-point connections. The threshold may be statically configured, e.g., 4 different receiver NACKs for a session, or dynamically calculated, e.g. it can be extrapolated from historical data that, e.g., 2 NACKs from different receivers within 3 seconds for a football-video service indicates that 5000 NACKs can be expected within 10 minutes. In the case that the sender has chosen to close point-to-point repair data delivery, and re-deliver the data using point-to-multipoint but not immediately, an embodiment would have the sender signal to the receivers that the repair session will occur in the future, and thus inform receivers which have not yet NACKed their missing data that they do not need to. Furthermore, this signalling to receivers may indicate exactly which fragments of data are to be resent, and thus enable receivers to establish the extent to which their content will be complete—and need for subsequent (point-to-point) repair thereafter. This enables a mixed point-to-multipoint & point-to-point repair.

Figure 5:
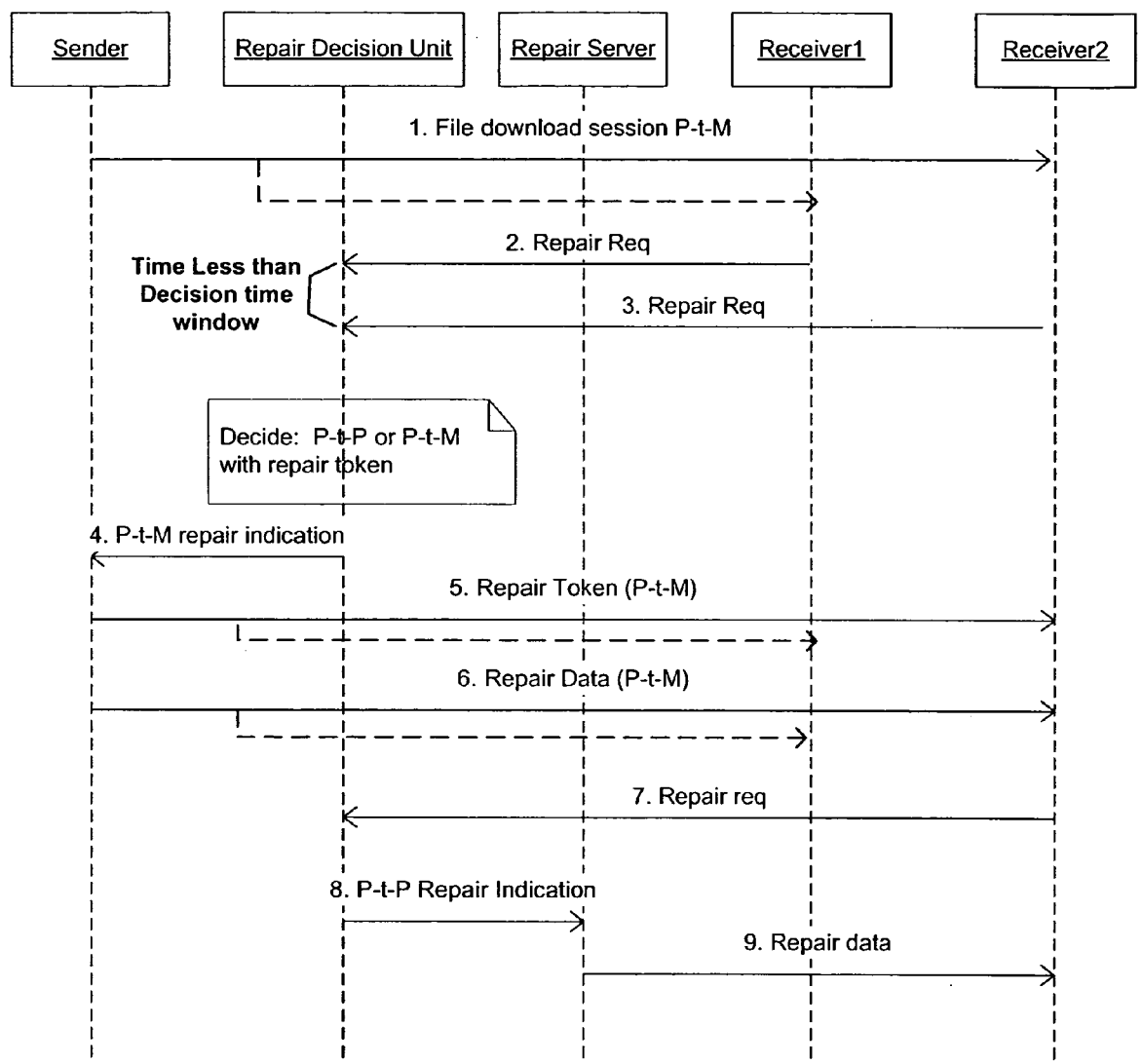
FIGS. 5-12 illustrate various embodiments of the invention.

FIG. 5 illustrates the embodiment of using Repair Token to Indicate P-t-M (Point-to-Multipoint) repair at a later time and subsequently using P-t-P (Point-to-Point) for tokens missing from P-to-M repair data. Repair token may be P-t-M or P-t-P in which cases it originates from Sender (Y) and Repair Sender (Z), respectively. The P-t-P or P-t-M decision maker (X) may be a distinct entity, or combined with Sender (Y) or Repair Server (Z). The P-t-P or P-t-M decision maker (X) may be a third entity, which may be embodied as a single or separate logical and/or physical device. The Repair Sender in FIG. 5 (an in other Figures) can be understood to be a repair server or similar. The P-t-P or P-t-M decision maker (or decision making unit) may also be called a repair decision unit.

Method A4:

As described in Method A1, a receiver should not request a retransmit (send a NACK) when the threshold(s) is reached. Another embodiment is to change the context of a receiver either by:

a) changing the NACK-suppression algorithm or its parameters; and/or
b) changing the mode of operation.

The "should not NACK" (or must not NACK) mentioned above presents an extreme case of changing the NACK-suppression algorithm. Another alternative is to change the behaviour in such way that if error rate below the threshold then
"uniformly randomise the NACK(s) over a time period X, starting from the end of the initial delivery session"
else
"must wait until after a certain time Y after the initial session ends, and then randomise the NACK(s) over a time period Z".

X, Y, Z can be chosen to be different or even equal values. This is particularly useful in enabling a "quick repair plus slow repair" to maximise perceived user QoS. Users who's receivers got many errors in initial delivery are likely to experience worse QoS in any case—if they wish to consume the content immediately after delivery, they will have a potentially long repair session to wait for anyway. However, users who got very few errors are thus given priority in "repair resources", and so they should be able to quickly use the content after the initial session. Thus, this method enables even poor initial deliveries to complete, while ensuring that good initial deliveries are completed by repair at good user perceived QoS levels.

A generalization of the above is a method that uses an array of error rates [ER1, ER2, . . . , ERn], an array of NACK(s) randomizations [X1, X2, . . . , Xn], an array of waiting times [Y1, Y2, . . . , Yn] and an array or NACK(s) randomizations [Z1, Z2, . . . , Zn], where for each k=1, . . . , n, n in N+, the 4-tuple (ERk, Xk, Yk, Zk) indicates that for an error rate <ERk, the receiver must uniformly randomize the NACK(s) over a time period Xk, and for and error rate >=ERk, the receiver must wait until after a certain time Yk after the initial session ends, and then randomize the NACK(s) over a time period Zk. The array of waiting times may be a zero-values array.

Some NACK suppression schemes allocate more than one role to receivers/hosts. For instance, a flag-holder scheme expects the flag-holder(s) to respond immediately to errors and other receivers to NACK (randomly), if they do not become aware that the flag-holder(s) NACKed already (similar to IMGP for reporting group membership). An embodiment of the present invention would be to change the mode of operation of a receiver. For instance, if a threshold were exceeded (or alternatively not reached) then the receiver would adopt another role. In the flag-holder example, a receiver under a very low threshold (e.g., with only one error) might NACK immediately or within a very short time window, and other receivers would NACK later.

A combinatory embodiment would associate "receiver roles" with NACK-suppression algorithm/parameters such that a certain role (e.g., "low error mode" or "high error mode") defines the operation of NACKs, and the threshold is used to calculate the mode, which should be used. It may be advantageous to also in—clude hysteresis with these kinds of decision processes, so that the mode may be changed after a number of consecutive measurements—e.g., if a receiver exceeds the threshold only one in 100 measurements, it may not change mode.

Figure 6:
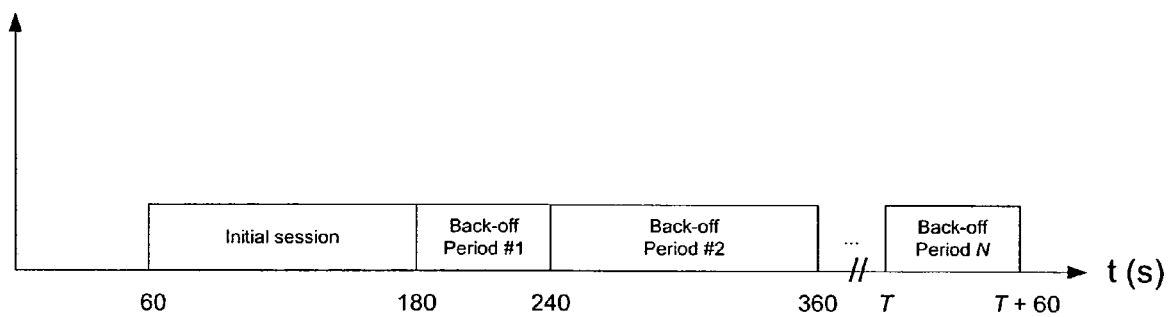
Figure 7:
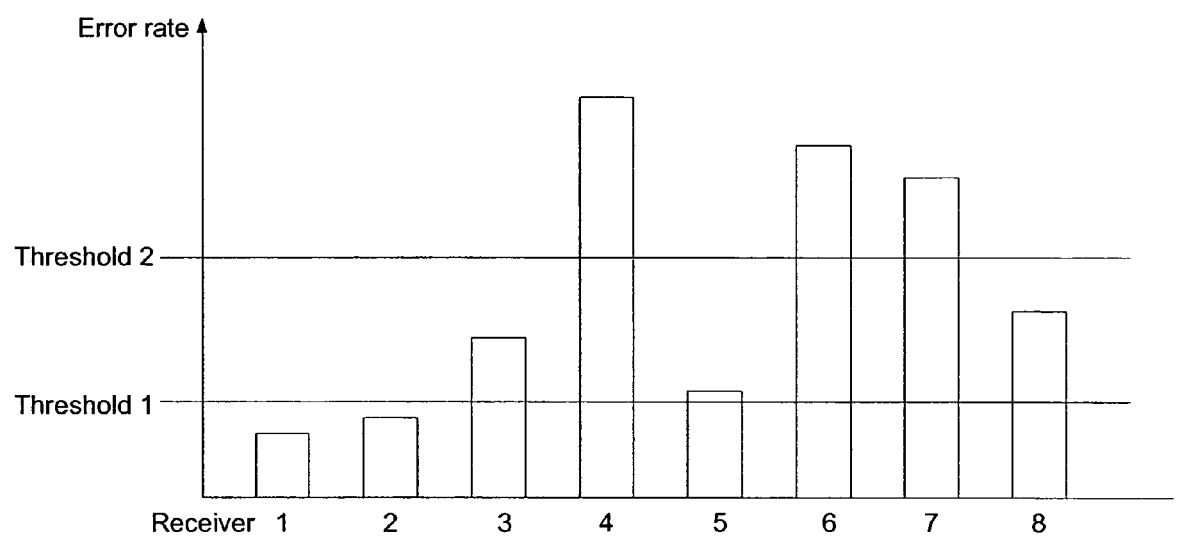

FIG. 6 illustrates distribution of Back-off times. FIG. 7 shows that for all receivers that experience error rate below Threshold 1 (that is, receivers 1 and 2), the requests are distributed over 60 sec after the start of the session. For receivers that experience error rate higher than Threshold 1 but smaller than Threshold 2 (that is, receivers 3, 5 & 8), the request is sent 60 seconds later and distributed over 120 seconds.

Method A5:

As described in Method A1, an error rate threshold may be used. Another embodiment provides this and also a time and/or data window in which to calculate the threshold. For example, "10% packet error rate; any, 30 seconds window, sliding" could indicate that the threshold is 10% of packets (missing or contain errors) within the last 30 seconds and to sample from the last 30 seconds continuously (or pseudo-continuously) with a sliding time window. Another example would be "5% bit error rate, any, 2 Kbyte window, blocked" so that the threshold is 5% of bits are erroneous for one or more (any) 2 Kbyte block, where 0-2 KB, 2-4 KB, 4-6 KB, etc. are the blocks sampled. Any data matching the criteria is an embodiment; however in large data transfers it may be advantageous to provide a second level threshold instead, such as "consider threshold reached, if this criteria is met 3 times within a session".

Figure 8:
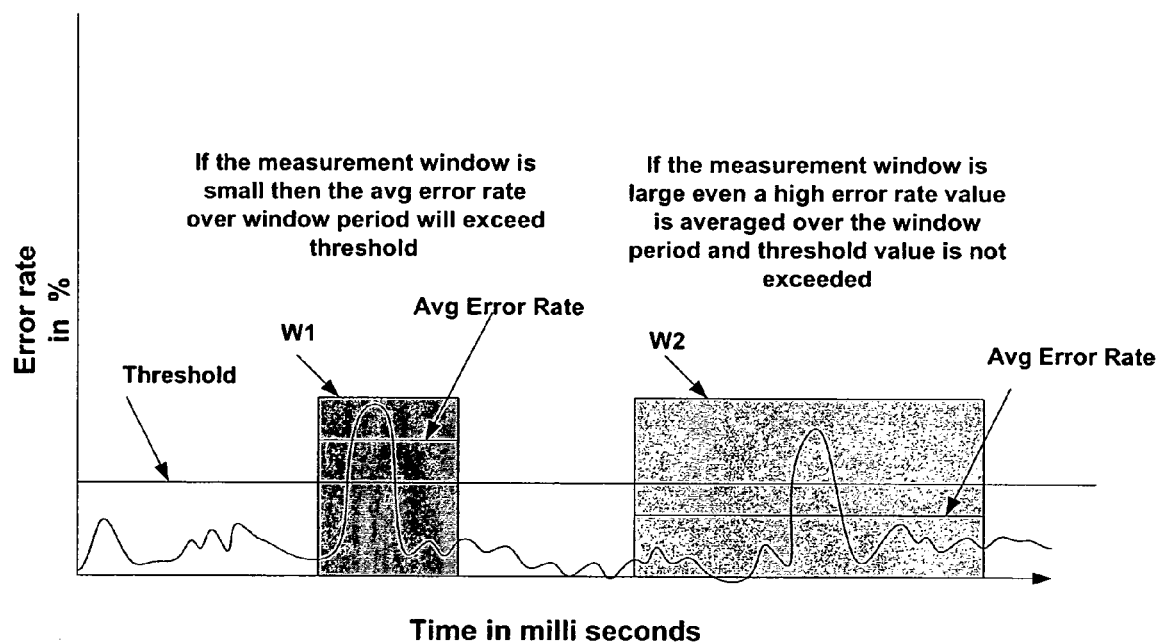

FIG. 8 illustrates the effect of time window for calculation of threshold values.

Method A6:

Some embodiments may share/deliver the parameters discussed between server and receiver by pre-configuring. For example, such as saving to a SIM card by the operator, which issues the SIM and operates the Multicast system. Another example is to have well known parameters pre-configured, and usually such well known figures would be specified in a standard or maintained by a numbers registry organisation (such as IANA). In an embodiment, the default values of these parameters are pre-configured and are superseded (overwritten) for a certain session if another method to deliver the parameters is also provided.

Method A7:

A further embodiment of the invention shall, after receiving a repair request from a receiver for a significantly large amount of content data, have the sender indicate to the receiver that is will "repair this later". The subsequent repair session may be a point-to-point or point-to-multipoint session. Thus, where system bandwidth is the predominant limiting scalability factor, this allows a sender to take care of receivers that can be satisfied quickly first, and in so doing reduce the average time to ensure than a target number of receivers (e.g., 99%) have complete (error free) data. For example, the repair may be started by point-to-multipoint repair first (to repair the largest number of receivers), and then followed by point-to-point repairs (to repair a minor number of receivers).

Method A8:

The above generally used the end-of-session as the initiation point for repair sessions and signalling. However, in some embodiments the use of object (e.g., file or scene) end, threshold (e.g., every 1 Mbyte of data or every 1000 packets or every 5 minutes) or session group (e.g., the end of all of these 4 related sessions) may be advantageous.

Figure 9:
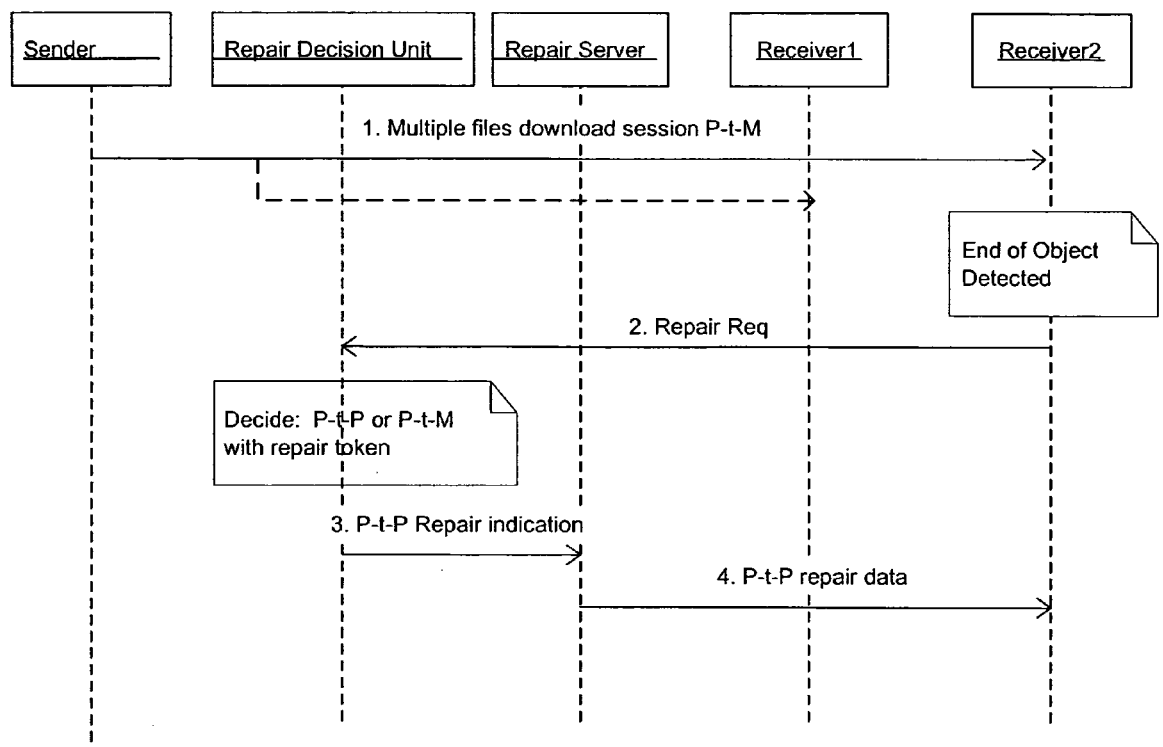

FIG. 9 illustrates the start of repair session after end of object detected.

B) Receiver Driven Repair Methods

Generally, a receiver can delay the request of point-to-point connection establishment for data repair of a certain amount of time, avoiding to perform this request right after the end of the multicast/broadcast session. This avoids the situation in which a larger number of receivers send requests of point-to-point connections for repair simultaneously, and therefore congestion of the network and sender. In the following, some methods of delaying the point-to-point repair request are given:

Method B1:

The repair can be a lazy repair: in this case, the receiver performs the point-to-point repair request when the user wants to consume the data (e.g., when the user wants to play the video clip that has been downloaded during a multicast/broadcast session). This requires that the user waits for the time it takes to perform the complete point-to-point repair (i.e., it increases the user latency for data fruition). This method optionally requires also that the sender transmits in the session announcement (using SDP or any other suitable mean) the maximum repair availability time, that is the time limit until the sender is able to perform successfully the point-to-point repair. The format of this time unit is not specified, but it can be expressed in a variety of ways (for example, but not restricted to, absolute time, or relative time). After the maximum repair availability time, the point-point repair operation is not guaranteed to succeed. This gives a time limit to the sender to keep data stored to perform data repair. If the point-to-point repair has not been performed by the maximum repair availability time (because the user has not requested the data playback yet), then the receiver is forced to perform the point-to-point repair at that time. If the receiver is switched off, and the maximum repair availability time elapses, then the point-to-point repair at a successive time is not guaranteed. In some cases. It is advantageous to reduce the period over which NACKs are randomised to allow a "safety margin" at the end; for instance, if the period is 432000 seconds, NACKs are generally distributed over 400000 seconds allowing a maximum of 32000 for "deactivated" receivers to be powered up without missing the guaranteed repair time.

An example of the preceding is as follows:

If the sender sends in its announcement that the maximum repair availability time is until 15 Mar. 2004 17:00, it means that the receivers can perform repair until that date and time specified. After that date/time, the repair operation is not guaranteed. An alternative way could be to express the time as relative time from the multicast/broadcast transmission. For example the sender may signal to the receivers that the maximum repair availability time is 432000 seconds. This tells the receiver that the last possibility to make a point-to-point repair is after 5 days from the multicast/broadcast transmission.

Figure 10:
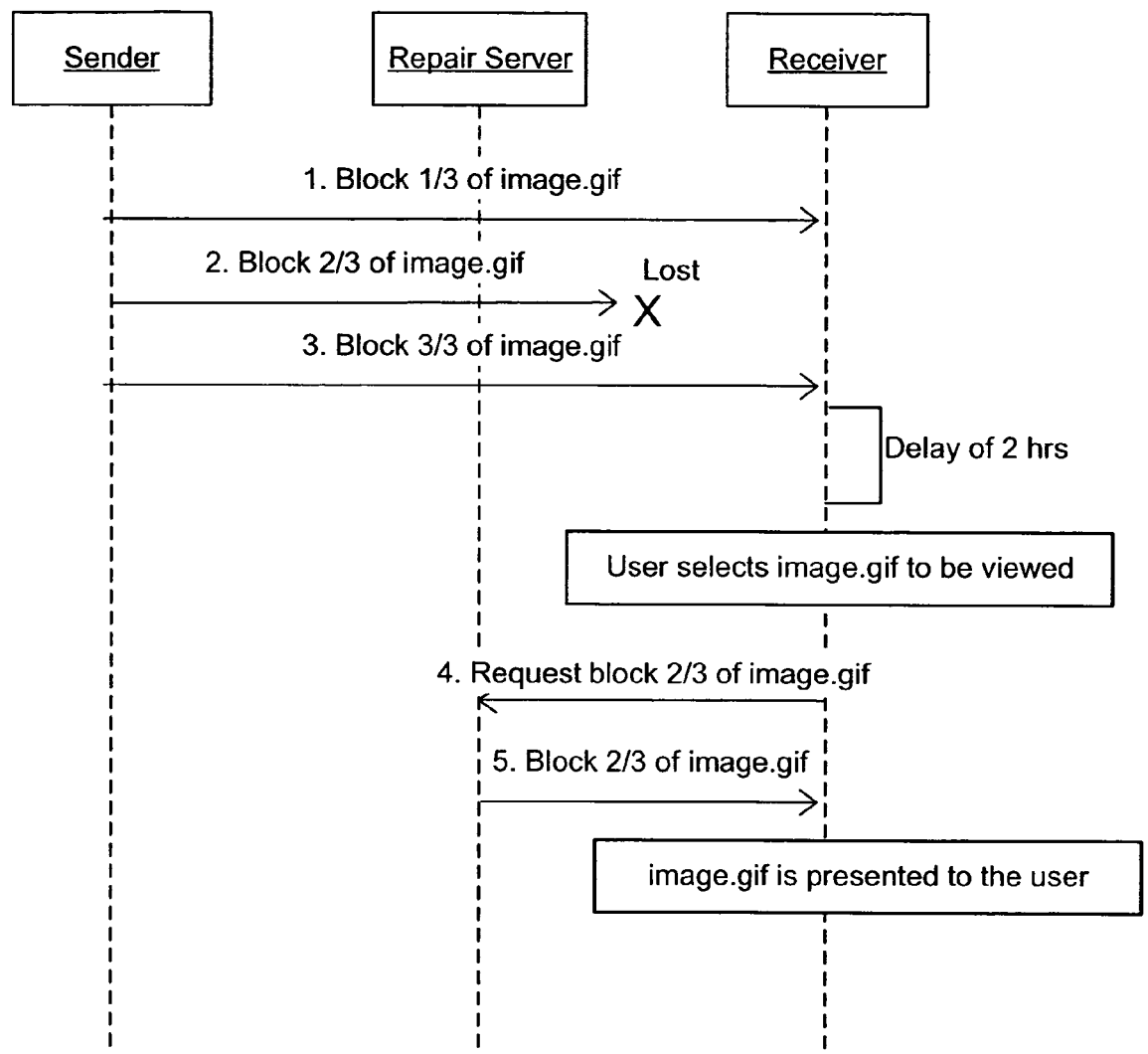

FIG. 10 illustrates the embodiment of lazy repair.

Method B2:

The repair can be a lazy playback repair: in this case the receiver performs the point-to-point repair request when the user wants to consume the data. In addition, the repair takes into account the position of the first loss in the data stream. If the stream is a speech or audio and video stream, the receiver can compute exactly at what media unit time the first data loss occur. The point-to-point repair can then be deferred to start even after playback of the data stream start, in the best case, but it must be performed and completed early enough in such way that the receiver playback is not subject to continuity disruption.

If the point-to-point repair operation cannot be performed concurrently to the playback (because the point-to-point repair operation would require a time larger than the time-to-the-first-missing block), then the point-to-point repair can be started immediately when the user issues the playback request, but the actual playback is delayed by the necessary time in order to avoid playback disruption. This scheme is very similar to the first scheme (Method B1) above, but it offers a lower user latency because the repair operation and the playback are temporally partially overlapping.

Also in this case, the maximum repair availability time information could be optionally required and used by the receiver as in the first case (Method B1).

The time required to perform the point-to-point repair can be estimated by the receiver based on factors like the measured or granted bandwidth of the point-to-point connection, the measured Round Trip Time over the point-to-point channel, and the point-to-point session establishment and termination delay.

An example of the preceding is as follows: If the sender transmits a 5 min audio/video clip and the receiver detects that there are 30 missing packets, the earliest of which occurs at time 4', then the user can start playback of the stream immediately, and the receiver will start the point-to-point repair operation concurrently with the user playback early enough so that all the 30 missing packets arrive before 4 minutes of playback. If the 30 missing blocks are such that the first missing block occurs at time 1', and the receiver estimates that the point-to-point repair session will take more than one minute, then the repair session is started and the playback is delayed a time necessary to avoid playback disruption.

Figure 11:
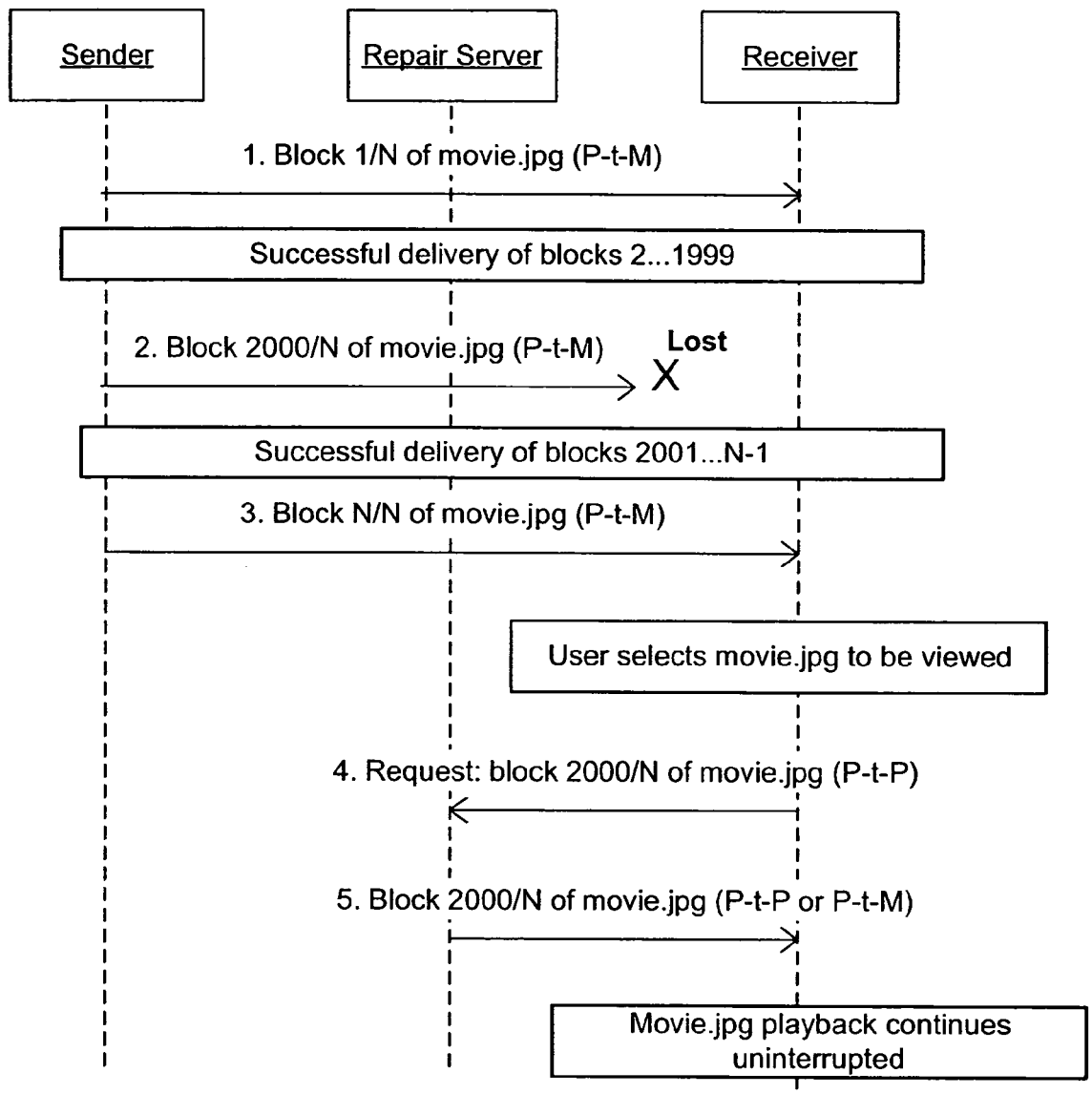

FIG. 11 illustrates the embodiment of lazy playback repair.

Method B3:

Another case (analogous to the receiver-driven application of method A7) is that the NACK-suppression uses the quantity of erroneous/missing data as a multiplier to calculate the recovery time. For example, if a sender indicates a "unit of time" is 60 seconds, and that a unit of lost data is 10 packets, a receiver with 56 lost packets would calculate a time of INT(56/10)*60=300 seconds. These resulting times may be used as an offset (do not start NACKing before this many seconds have elapsed after the initial session ends) and/or as the period to distribute the NACKs over (e.g. randomise your NACK uniformly over this time).

Method B4:

A further embodiment of the invention is the possibility of starting the point-to-point repair session before the initial multicast/broadcast transmission has ended. In this way the repair is faster and the user can start the error-free "play" session with a shorter latency. The exact repair start time can be decided by the receiver, or it can be a function of the location of the first error within the data stream and/or the length of the file.

Figure 12:
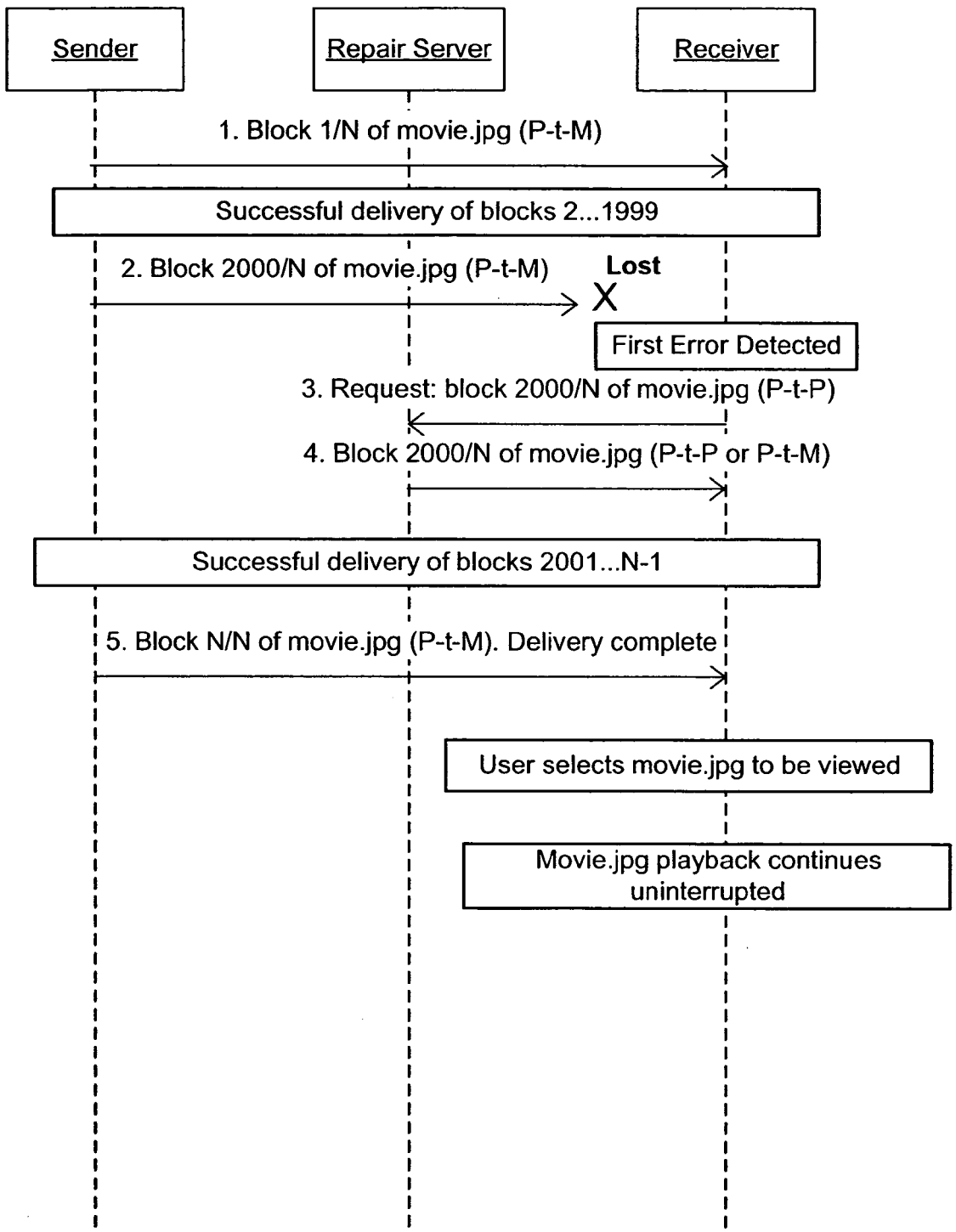

FIG. 12 illustrates the embodiment of repair started due to "early detection".

All the methods described above can also be used in any possible and functionally suitable combination.

Figure 3:
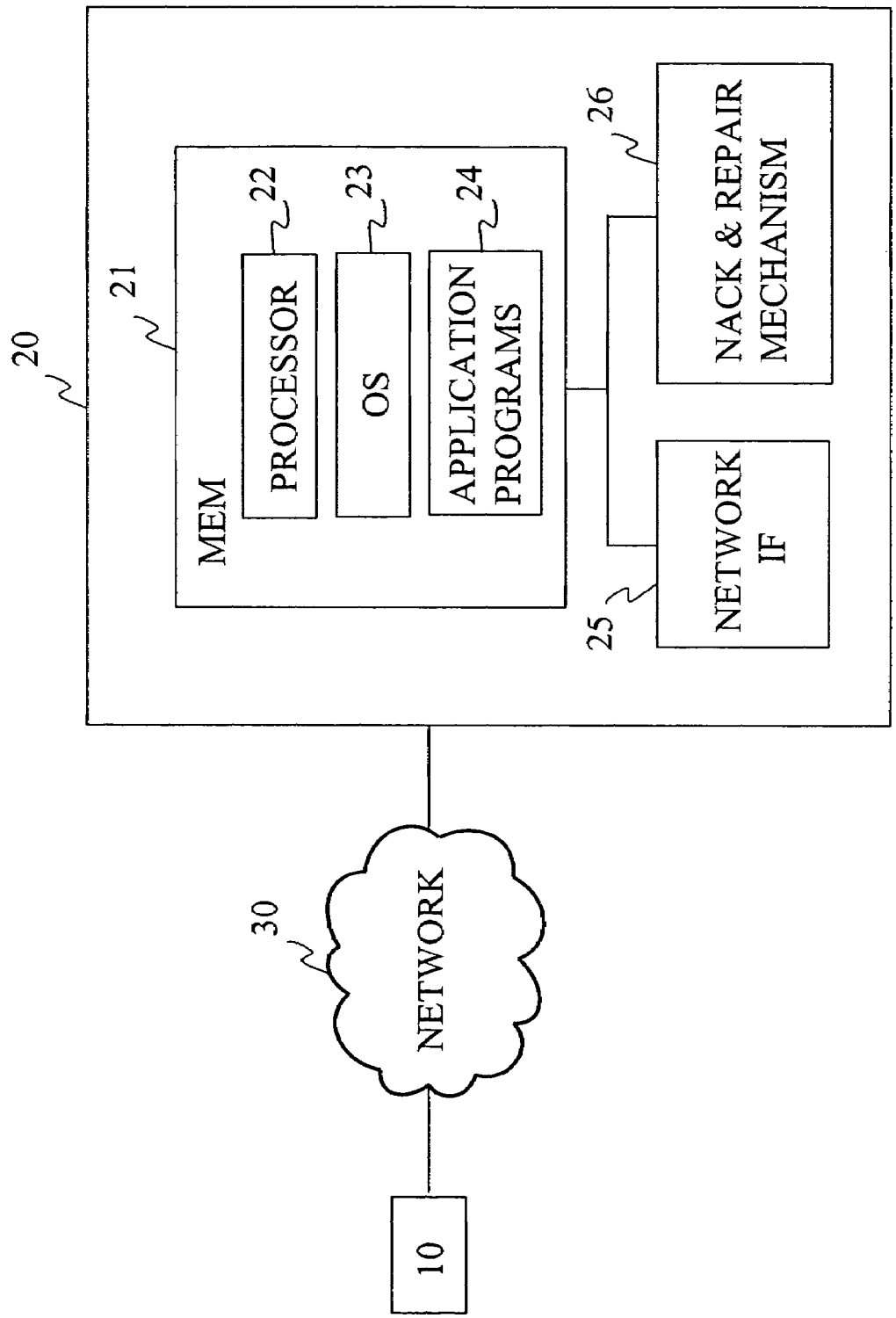
FIG. 3 shows a system and details of a receiver device in accordance with an embodiment of the invention.

FIG. 3 shows a system and details of a receiver device 20 in accordance with an embodiment of the invention. The system comprises the sender device 10 a transmission network 30, e.g., an IP network or another fixed network, a wireless network or a combination of a fixed and a wireless (cellular) network etc., and the receiver device 20. The receiver device 20 can be a cellular telephone, a satellite telephone, a personal digital assistant or a Bluetooth device, WLAN device, DVB device, or other similar wireless device. The device 20 includes an internal memory 21, a processor 22, an operating system 23, application programs 24, a network interface 25 and a NACK & repair mechanism 26. The internal memory 21 accommodates the processor 22, operating system 23 and application programs 24. The NACK & repair mechanism 26 enables the NACKing and repair procedures in response to missing or mangled data in a data transmission. The device 20 is able to communicate with the sender device 10 and other devices via the network interface 25 and the network 30.

Figure 4:
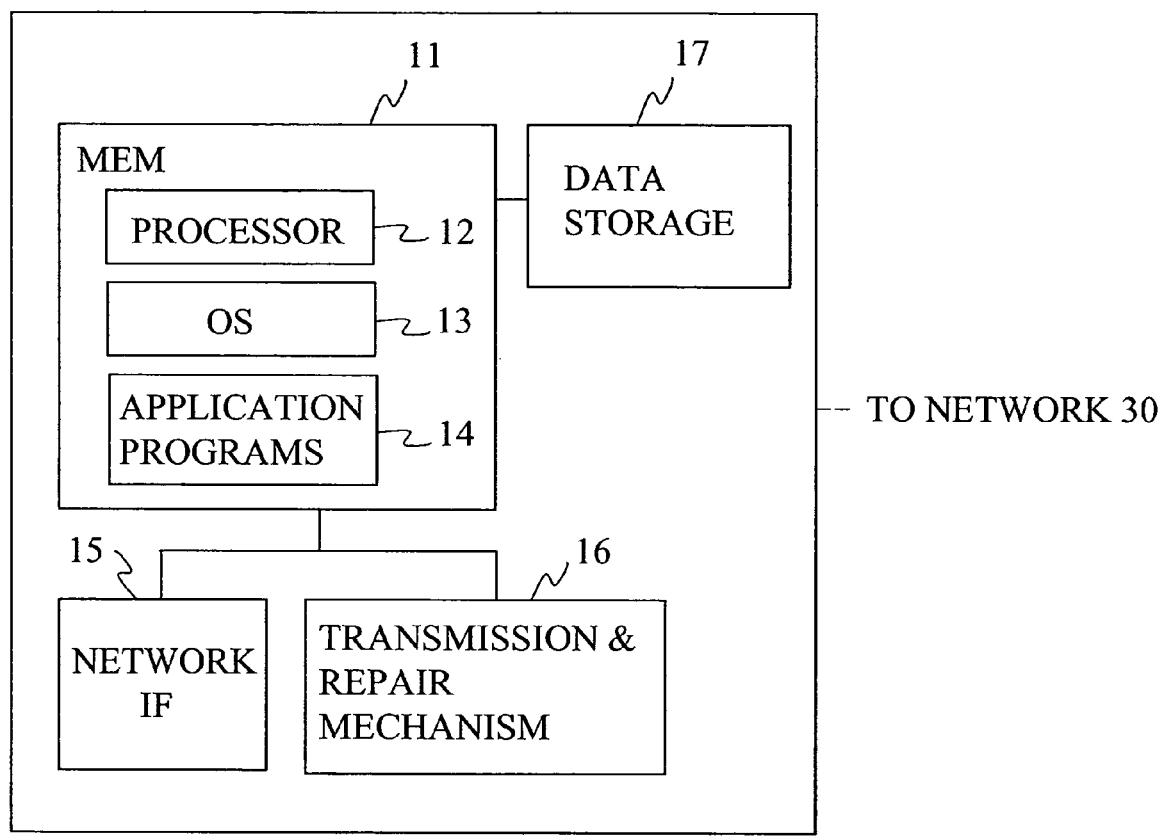
FIG. 4 shows a sender device in accordance with an embodiment of the invention.

FIG. 4 shows a sender device 10 in accordance with an embodiment of the invention. The sender device 10 can be, for example, a network server or any suitable device intended for file (or media) delivery. The device 10 includes an internal memory 11, a processor 12, an operating system 13, application programs 14, a network interface 15, a transmission & repair mechanism 16 and a data storage 17. The internal memory 11 accommodates the processor 12, operating system 13 and application programs 14. The transmission & repair mechanism 16 enables the transmission of data packets to receiver device(s) 20. Furthermore, it enables re-transmission of data packets in repair sessions. Data to be sent to receiver devices 20 and data to be re-transmitted can be stored in the data storage 17. Alternatively, data can be stored in a separate device co-located with or outside of the sender device 10. The device 10 is able to communicate with the receiver device 20 and other devices via the network interface 15 and the network 30.

Procedures relating to repair of missing data can be implemented by software. A computer program product comprising program code stored in the receiver device 20 and run in the processor 22 can be used to implement the procedures at the receiving end of the transmission session, whereas a computer program product comprising program code stored in the sender device 10 and run in the processor 12 can be used to implement the procedures at the transmitting end.

Embodiments of the invention have been illustrated with examples of logical sender/server entities and receiver units. The use of a third entity going between for repair requests, and repair responses (if appropriate), also falls within the scope of embodiments of the invention. Such an entity may provide firewall, proxy and/or authorization services, for instance to authorize a repair sender message to a point-to-multipoint sender asking it to deliver a repair token; or to act as a repair request aggregator/proxy for messages from recievers to sender and thus enable a transparent point-to-point/point-to-multipoint decision in a third device.

The use of point-to-multipoint delivery of repair tokens has been presented in the preceding. Additionally, the use of point-to-point repair tokens may be advantageous in some embodiments and is within the scope of embodiments of the in—vention (a method of delivery/format corresponding to what has been presented relating to point-to-multipoint repair tokens can be used, e.g., SDP). Such a scheme may indicate to a receiver that point-to-multipoint repair/resend data is "on its way" if a point-to-point request has arrived after the decision to resend by point-to-multipoint has been made, or alternatively to enable a receiver to deactivate its multipoint reception for a time, for power saving, but still learn of a forthcoming point-to-multipoint repair_response/ resend.

With embodiments of the invention NACK suppression is enabled to provide scalable reliable multicast. An efficient and scalable point-to-point repair for multicast/broadcast transmissions is provided, avoiding feedback implosion and network/sender overload.

Particular implementations and embodiments of the invention have been described. It is clear to a person skilled in the art that the invention is not restricted to details of the embodiments presented above. Furthermore, one skilled in the art will be aware that there are many additional ways to embody this invention, which are within the scope of this invention, even though not shown in one of the limited subset of examples. Especially, the invention should not be limited to any specific names of any protocols, parametres or messages. The invention can be implemented in other embodiments using equivalent means without deviating from the characteristics of the invention. The scope of the invention is only restricted by the attached patent claims.

The invention claimed is:

1. Method comprising:
   transmitting data from a sender to at least one receiver in a one-to-many fashion;
   providing sender driven or receiver driven repair of missing data, concerning data missing at the receiver, wherein both the sender driven and receiver driven repair comprise sending a repair request from said receiver to said sender, and wherein the method further comprises:
   distributing messaging concerning repair over a period of time to avoid congestion.

2. The method of claim 1, wherein repair is implemented in a repair session comprising one of the following:
   re-transmitting missing data in total;
   re-transmitting only a part of missing data; and
   repeating original transmission in a whole.

3. The method of claim 1, wherein an error rate parameter is transmitted from sender to receiver to be used as a threshold in requesting repair of missing data.

4. The method of claim 3, wherein said error rate parameter is used to calculate the threshold in a time and/or data window.

5. The method of claim 1, wherein the method comprises indicating to receivers that a session or part of it will be re-transmitted in a point-to-multipoint fashion.

6. The method of claim 5, wherein said indication is implemented with the aid of a point-to-multipoint repair token.

7. The method of claim 1, wherein the method comprises generating random or pseudo-random time dispersion of repair requests to be sent from receiver(s) to sender.

8. The method of claim 7, wherein the method provides for statistically uniform distribution over a relevant period of time.

9. The method of claim 1, wherein the method comprises using receiver roles.

10. The method of claim 9, wherein one or more of the roles comprise a back-off time given by offset time and random time period.

11. The method of claim 9, wherein one or more of the roles comprise flag-holder behaviour.

12. The method of claim 1, wherein the method comprises sharing time parameter(s) and/or data parameter(s) and/or error parameter(s) between sender and receiver by pre-configuring.

13. The method of claim 1, wherein the method comprises indicating from server to receiver, after receipt of a repair request, that repair will be performed only later.

14. The method of claim 1, wherein the method comprises prioritizing between different repair methods.

15. The method of claim 14, wherein the method comprises first starting point-to-multipoint repair followed by point-to-point repair.

16. The method of claim 1, wherein the method comprises using an initiation point for repair sessions/signalling, said initiation point being selected from a group comprising: end of a session, object end, object threshold and end of a session group.

17. The method of claim 1, wherein the method comprises delaying sending of a repair request at the receiver.

18. The method of claim 1, wherein said repair request is delayed with a pre-determined amount of time.

19. The method of claim 1, wherein a repair request is performed only when the need to consume the data at the receiver arises.

20. The method of claim 1, wherein a maximum repair availability time is provided.

21. The method of claim 19, wherein the method further comprises taking into account a position of a first loss in data stream.

22. The method of claim 1, wherein a recovery time is calculated and used in missing data repair.

23. The method of claim 1, wherein a separate repair session is requested and/or started before an initial multicast/ broadcast transmission has ended.

24. The method of claim 1, wherein the method comprises calculating a repair request suppression time to wait before requesting repair.

25. Apparatus comprising:
   means for receiving data transmitted by a sender; in a one-to-many fashion;
   means for sender driven or receiver driven repair of missing data, concerning data missing at the receiver device; means for sending a repair request to the sender; and means for distributing messaging concerning repair over a period of time to avoid congestion.

26. Apparatus comprising:
means for transmitting data to at least one receiver; in a one-to-many fashion;
means for sender driven or receiver driven repair of missing data, concerning data missing at the receiver;
means for receiving a repair request from the receiver; and
means for distributing messaging concerning repair over a perioid of time to avoid congestion.

27. System comprising:
means for transmitting data from said sender device, via said network, to said at least one receiver device; in a one-to-many fashion;
means for providing sender driven or receiver driven repair of missing data, concerning data missing at the receiver device;
means for sending a repair request from the receiver to the sender; and
means for distributing messaging concerning repair over a period of time to avoid congestion.

28. Computer readable medium having stored thereon a computer proaram executable in a receiver device, the computer-program comprising:
program code for causing the receiver device to receive data transmitted by a sender in a one-to-many fashion;
program code for sender driven or receiver driven repair of missing data, concerning data missing at the receiver device, wherein both the sender driven and receiver driven repair comprise sending a repair request from the receiver to the sender; and
program code for distributing messaging concerning repair over a period of time to avoid congestion.

29. Computer readable medium having stored thereon a computer program executable in a sender device, the computer program comprising:
program code for causing the sender device to transmit data to at least one receiver in a one-to-many fashion;
program code for sender driven or receiver driven repair of missing data, concerning data missing at the receiver, wherein both the sender driven and receiver driven repair comprise sending a repair request from the receiver to the sender; and
program code for distributing messaging concerning repair over a period of time to avoid congestion.

30. Apparatus, comprising:
a receiver for receiving data transmitted in a one-to-many fashion by a sender device, wherein the apparatus is configured for sender driven or receiver driven repair of missing data, concerning data missing at the receiver device, the apparatus further comprising:
a transmitter for sending a repair request to the sender device, wherein the apparatus is further configured for distributing messaging concerning repair over a period of time to avoid congestion.

31. The apparatus of claim 30, wherein the apparatus is configured to use an error rate parameter received from the sender device as a threshold in requesting repair of missing data.

32. The apparatus of claim 30, wherein the apparatus is configured to use a receiver role or roles.

33. The apparatus of claim 30, wherein the apparatus is configured to delay sending the repair request with a pre-determined amount of time.

34. The apparatus of claim 30, wherein the apparatus is configured to perform said repair request only when the need to consume the data at the apparatus arises.

35. The apparatus of claim 34, wherein the apparatus is configured take into account a position of a first loss in a data stream.

36. The apparatus of claim 30, wherein the apparatus is configured to calculate a recovery time to be used in said repair of missing data.

37. The apparatus of claim 30, wherein the apparatus is configured to request a separate repair session and/or a separate repair session to be started before an initial multicast/broadcast transmission has ended.

38. The apparatus of claim 30, wherein the apparatus is configured to calculate a repair request suppression time to wait before requesting repair.

39. Apparatus, comprising:
a transmitter for transmitting data in a one-to-many fashion to at least one receiver device, wherein the apparatus is configured for sender driven or receiver driven repair of missing data, concerning data missing at a receiver device, the apparatus further comprising:
a receiver for receiving a repair request from said receiver device, wherein the apparatus is further configured for distributing messaging concerning repair over a period of time to avoid congestion.

40. The apparatus of claim 39, configured to transmit to a receiver device an error rate parameter to be used as a threshold in requesting repair of missing data.

41. The apparatus of claim 39, configured to indicate to said receiver device that a session or part of it will be re-transmitted in a point-to-multipoint fashion.

42. The apparatus of claim 41, configured to so indicate with the aid of a point-to-multipoint repair token.

43. The apparatus of claim 39, wherein the apparatus is configured for using receiver roles.

44. The apparatus of claim 39, configured to first start point-to-multipoint repair followed by point-to-point repair.

45. The apparatus of claim 39, configured to use an initiation point for repair sessions/signalling, said initiation point being selected from a group comprising: end of a session, object end, object threshold and end of a session group.

46. The apparatus of claim 39, wherein the apparatus is configured to provide a maximum repair availability time.

47. The apparatus of claim 39, configured to start a separate repair session before an initial multicast/broadcast transmission has ended.

* * * * *

UNITED STATES PATENT AND TRADEMARK OFFICE
CERTIFICATE OF CORRECTION

PATENT NO. : 7,296,205 B2  
APPLICATION NO. : 10/782371  
DATED : November 13, 2007  
INVENTOR(S) : Curcio et al.

Page 1 of 1

It is certified that error appears in the above-identified patent and that said Letters Patent is hereby corrected as shown below:

In column 14, line 62, claim 25, line 2 ";" should be deleted.

In column 15, line 4, claim 26, line 2";" should be deleted.

In column 15, line 11, claim 26, line 9 "perioid" should be --period--.

In column 15, line 14, claim 27, line 3 ";" should be deleted.

In column 15, line 24, claim 28, line 2 "proaram" should be --program--.

In column 16, line 10, claim 35, line 2 "configured take" should be --configured to take--.

Signed and Sealed this

Nineteenth Day of August, 2008

JON W. DUDAS  
*Director of the United States Patent and Trademark Office*